(12) United States Patent
Grokop et al.

(10) Patent No.: US 10,133,329 B2
(45) Date of Patent: Nov. 20, 2018

(54) SEQUENTIAL FEATURE COMPUTATION FOR POWER EFFICIENT CLASSIFICATION

(71) Applicant: QUALCOMM Incorporated, San Diego, CA (US)

(72) Inventors: Leonard Henry Grokop, San Diego, CA (US); Disha Ahuja, San Jose, CA (US); Rashmi Kulkarni, Milpitas, CA (US); Shankar Sadasivam, San Diego, CA (US); Edward Harrison Teague, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 320 days.

(21) Appl. No.: 13/841,960

(22) Filed: Mar. 15, 2013

(65) Prior Publication Data
US 2014/0143579 A1    May 22, 2014

Related U.S. Application Data

(60) Provisional application No. 61/728,190, filed on Nov. 19, 2012.

(51) Int. Cl.
*G06F 1/28* (2006.01)
*G06F 9/48* (2006.01)

(52) U.S. Cl.
CPC .............. *G06F 1/28* (2013.01); *G06F 9/4893* (2013.01); *Y02D 10/24* (2018.01)

(58) Field of Classification Search
CPC ........ G06F 1/28; G06F 1/3206; G06F 1/3212; G06F 1/329; G06F 9/4893; Y02B 60/1292; Y02B 60/144; Y02B 60/18; Y02B 60/185
See application file for complete search history.

(56) References Cited

U.S. PATENT DOCUMENTS

| | | | |
|---|---|---|---|
| 7,440,751 | B2 | 10/2008 | Boros |
| 7,805,163 | B2 | 9/2010 | Namatame et al. |
| 2003/0126476 | A1* | 7/2003 | Greene .................. 713/300 |
| 2004/0002838 | A1 | 1/2004 | Oliver et al. |
| 2004/0268159 | A1 | 12/2004 | Aasheim et al. |

(Continued)

FOREIGN PATENT DOCUMENTS

| | | |
|---|---|---|
| CN | 1613055 A | 5/2005 |
| CN | 101877054 A | 11/2010 |
| CN | 102087712 A | 6/2011 |
| CN | 102193633 A | 9/2011 |
| TW | 201133357 A | 10/2011 |
| WO | WO-2012001215 A1 | 1/2012 |

OTHER PUBLICATIONS

International Search Report and Written Opinion—PCT/US2013/065431—ISA/EPO—dated Feb. 20, 2014.

*Primary Examiner* — Robert A Cassity
(74) *Attorney, Agent, or Firm* — Kilpatrick Townsend & Stockton LLP

(57) ABSTRACT

Disclosed is an apparatus and method for power efficient processor scheduling of features. In one embodiment, features may be scheduled for sequential computing, and each scheduled feature may receive a sensor data sample as input. In one embodiment, scheduling may be based at least in part on each respective feature's estimated power usage. In one embodiment, a first feature in the sequential schedule of features may be computed and before computing a second feature in the sequential schedule of features, a termination condition may be evaluated.

32 Claims, 11 Drawing Sheets

(56) References Cited

U.S. PATENT DOCUMENTS

| | | |
|---|---|---|
| 2008/0059823 A1 | 3/2008 | Balatsos et al. |
| 2008/0161712 A1 | 7/2008 | Leyde |
| 2008/0285797 A1* | 11/2008 | Hammadou ....... G06K 9/00771 382/103 |
| 2009/0225230 A1 | 9/2009 | Arroyo et al. |
| 2010/0223276 A1* | 9/2010 | Al-Shameri ...... G06F 17/30333 707/769 |
| 2011/0016455 A1* | 1/2011 | Perry ..................... G06F 11/34 717/130 |
| 2011/0044501 A1 | 2/2011 | Tu et al. |
| 2011/0085728 A1* | 4/2011 | Gao ..................... G06K 9/4671 382/165 |
| 2012/0210325 A1* | 8/2012 | de Lind Van Wijngaarden et al. ............................ 718/103 |
| 2013/0159454 A1* | 6/2013 | Hunter ................. H04L 67/125 709/217 |

* cited by examiner

SEQUENTIAL FEATURE COMPUTATION FOR POWER EFFICIENT CLASSIFICATION

CROSS-REFERENCE TO RELATED APPLICATIONS

This application claims the priority to U.S. Provisional Application No. 61/728,190, filed Nov. 19, 2012, and entitled "Sequential Feature Computation for Power Efficient Classification," the entirety of which is hereby incorporated by reference herein.

FIELD

The subject matter disclosed herein relates generally to power management techniques and feature scheduling.

BACKGROUND

Electronic devices can be equipped with a variety of sensors and inputs to monitor and discover information about a device's environment. For example, an accelerometer coupled to a device may be used to measure aspects of device movement.

Programs or applications running on a device may make frequent use of the data received from sensors such as the accelerometer, and may frequently process the incoming data from sensors in order to provide an enhanced user experience. In some cases a device processes incoming data continuously from multiple active sensors. In some cases, the code or programs to process sensor data may use a relatively large amount of power resources. Constant and/or intensive processing of device sensor data can have a significant impact on the length of time a user can use a device before depleting a battery.

Therefore, new and improved power efficient sensor data processing techniques are desirable.

SUMMARY

Embodiments disclosed herein may relate to a device that schedules features for sequential computing. The device may include a memory and a processor coupled to the memory. The processor may be configured to schedule sequentially, a plurality of features for computing, wherein each of the plurality of features receives a sensor data sample as input, and wherein the scheduling is based at least in part on each respective feature's estimated power usage. In one embodiment, a first feature is computed before computing a second feature in the sequential schedule of features for computing and a termination condition is evaluated.

In some embodiments, a method comprises computing a first feature of an ordered plurality of features, wherein each of the plurality of features receives a sensor data sample as input, and wherein the order of the plurality of features is based on an estimated computing power usage for at least one feature of the plurality of features; and evaluating, before computing a second feature of the ordered plurality of features, a termination condition. In some embodiments, the plurality of features are sequentially ordered. In some embodiments, the method further comprises estimating computing power usage for each of the features of the plurality of features, and ordering the plurality of features based on the estimating. In some embodiments, the method further comprises determining the termination condition is met as a result of the computing of the first feature; and classifying the sensor data sample. In some embodiments, the method further comprises computing the second feature in the sequential order of features for computing; determining the termination condition is satisfied by a result of the computing the second feature; and classifying the sensor data sample. In some embodiments, the sensor data sample originates from one or more sensors. In some embodiments, the sensors are one or more of: an accelerometer, a gyroscope, a magnetometer, or a microphone. In some embodiments, evaluating a termination condition comprises comparing the first feature with a training data set. In some embodiments, the method further comprises computing a confidence value; and determining the termination condition is met based on the confidence value being greater than a threshold value. In some embodiments, the order of the plurality of features is further based on a feature's estimated likelihood of classifying the sensor data sample. In some embodiments, the method further comprises comparing the first feature with a pre-computed training data sample.

In some embodiments, a method comprises sequentially computing one or more features of a plurality of features based on estimated computing power usage for the features, wherein each of the plurality of features receives a sensor data sample as input; and evaluating a termination condition before computing additional features of the plurality of features. In some embodiments, the termination condition is evaluated after each feature computed. In some embodiments, the method further comprises classifying the sensor data sample based on the computed features.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Device Overview

Figure 1:
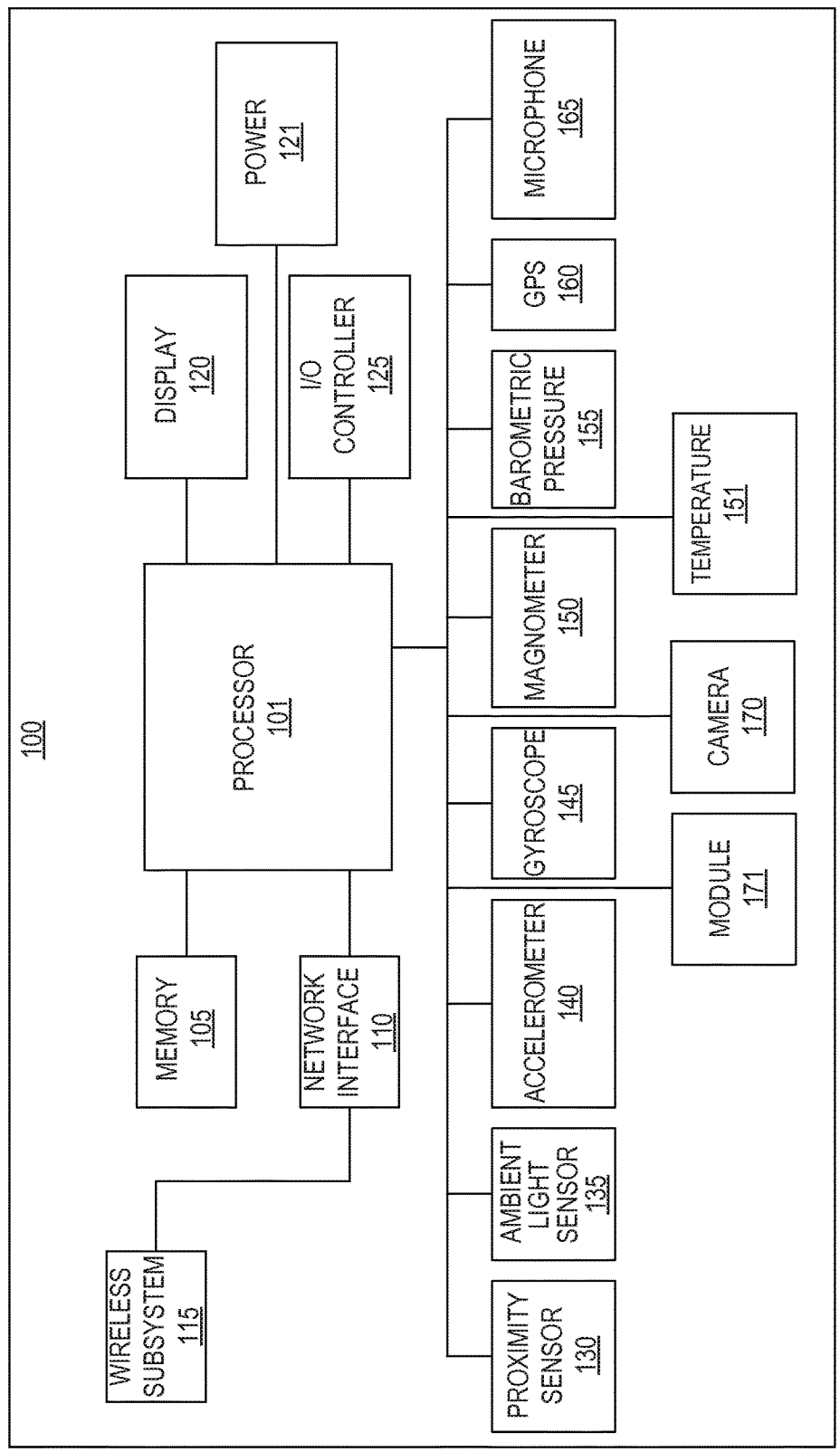
FIG. 1 is a block diagram of a system in which aspects of the present disclosure may be practiced.

FIG. 1 is block diagram illustrating an exemplary data processing system in which embodiments of the present disclosure may be practiced. The system may be a device (e.g., the device 100), which may include one or more processors 101, a memory 105, I/O controller 125, and network interface 110. Device 100 may also include a number of device sensors coupled to one or more buses or signal lines further coupled to the processor 101. It should be appreciated that device 100 may also include a display 120, a user interface (e.g., keyboard, touch-screen, or similar devices), a power device 121 (e.g., a battery), as well as other components typically associated with electronic devices. In some embodiments the device 100 may be a mobile or non-mobile device. Network interface 110 may also be coupled to a number of wireless subsystems 115 (e.g., Bluetooth, WiFi, Cellular, or other networks) to transmit and receive data streams through a wireless link to/from a wireless network, or may be a wired interface for direct connection to networks (e.g., the Internet, Ethernet, or other wireless systems). Thus, device may be a: mobile device, wireless device, cell phone, personal digital assistant, mobile computer, tablet, personal computer, laptop computer, or any type of device that has processing capabilities.

Device can include sensors such as a proximity sensor 130, ambient light sensor (ALS) 135, accelerometer 140, gyroscope 145, magnetometer 150, barometric pressure sensor 155, and/or Global Positioning Sensor (GPS) 160. In some embodiments, microphone 165, camera 170, and/or the wireless subsystem 115 are used as sensors to analyze the environment of the device. For example, images from camera 170 can provide data for determining whether the camera 170 is being blocked by an external object which in turn can help determine the location of the device (e.g., within a user's pocket or bag).

Memory 105 may be coupled to processor 101 to store instructions for execution by processor 101. In some embodiments, memory 105 is non-transitory. Memory 105 may also store one or more models or modules to implement embodiments described below. Memory 105 may also store data from integrated or external sensors. In addition, memory 105 may store application program interfaces (APIs) for accessing modules 171 (e.g., power profile module, scheduling module, and classifier module) described in greater detail below. Memory 105 may also store configuration files describing pre-defined feature scheduling information, training data sample, sensor data sample, or power profiles related to classes or features. While modules 171 are illustrated separate from other elements in the device 100, the module 171 may be wholly or partially implemented by other elements illustrated in FIG. 1, for example in the processor 101 and/or memory 105, or in another processor and/or memory of the device 100 or in one or more other elements of the device 100. Additional details regarding implementation of the module 171 are described below.

It should be appreciated that embodiments of the disclosure as will be hereinafter described may be implemented through the execution of instructions, for example as stored in the memory 105 or other element, by processor 101 of device and/or other circuitry of device and/or other devices. Particularly, circuitry of device, including but not limited to processor 101, may operate under the control of a program, routine, or the execution of instructions to execute methods or processes in accordance with embodiments of the disclosure. For example, such a program may be implemented in firmware or software (e.g. stored in memory 105 and/or other locations) and may be implemented by processors, such as processor 101, and/or other circuitry of device. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by device itself and/or some or all of the functions, engines or modules described herein may be performed by another system connected through I/O controller 125 or network interface 110 (wirelessly or wired) to device. Thus, some and/or all of the functions may be performed by another system and the results or intermediate calculations may be transferred back to device. In some embodiments, such other device may comprise a server configured to process information in real time or near real time. In some embodiments, the other device is configured to predetermine the results, for example based on a known configuration of the device. Further, one or more of the elements illustrated in FIG. 1 may be omitted from the device 100. For example, one or more of the sensors 130-165 may be omitted in some embodiments.

Sequential Feature Computation Overview

A device may process or compute data received from one or more sensors (e.g., the proximity sensor 130, ALS 135, accelerometer 140, gyroscope 145, magnetometer 150, barometric pressure sensor 155, temperature sensor 151, GPS 160, microphone 165, camera 170, the wireless subsystem 115 or other sensor) to output and/or report information related to the device's environment. The device may have access to an always-on or frequently active classifier to interpret one or more streams or samples of sensor data. In one embodiment, the classifier is implemented as one or more modules or engines as described in detail below.

Figure 2:
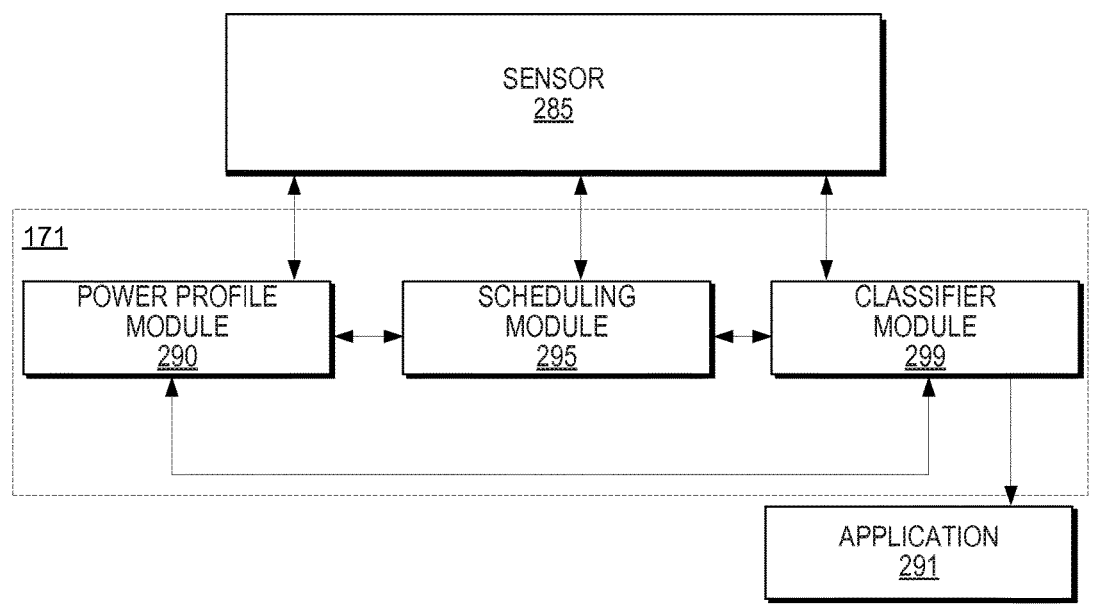
FIG. 2 is block diagram of a system including sensors and exemplary processing modules, in one embodiment.

FIG. 2 is block diagram illustrating a subsection of the device 100 including sensors 285 and exemplary processing modules 171, in one embodiment. The sensors 285 may comprise any one or more of the proximity sensor 130, ALS 135, accelerometer 140, gyroscope 145, magnetometer 150, barometric pressure sensor 155, temperature sensor 151, GPS 160, microphone 165, camera 170, the wireless subsystem 115 or other sensor. The modules 171 may be implemented directly in hardware or firmware, for example as a subcomponent of the device 100 with a dedicated processor or an implementation sharing a central processing unit (e.g., processor 101). Alternatively, the modules may be implemented in software executed by a processor, or with a combination of software and hardware. The software module may reside in memory, for example, memory 105 or other form of storage media known in the art. Persons of skill in the art will recognize the modules disclosed herein may represent a functional process for carrying out aspects of sequential feature computation that can be implemented in a variety of alternative implementations known in the art. While the classifier module 299, power profile module 290, and scheduling module 295 are separately illustrated in FIG. 2, the functionality of one or more of these modules may be combined or may be distributed in a different manner than described above. For example, the power profile module 290 and scheduling module 295 may be combined in some embodiments. Similarly, the classifier module 299 and scheduling module 295 may be combined in some embodiments and/or the classifier module 299 and power profile module 290 may be combined in some embodiments, or all of the classifier module 299, power profile module 290, and scheduling module 295 may be combined into a single module or separated among more than three modules.

In one embodiment, a power profile module (e.g., the power profile module 290) can determine the estimated power usage to compute a feature. In one embodiment, a scheduling module (e.g., the scheduling module 295) can receive sensor data and automatically schedule feature processing. In one embodiment, a classifier module (e.g., the classifier module 299) can process or compute features from a sensor data sample, and output a classification. As used herein, a data sample can include a portion of data received or output from a sensor (e.g., the sensors 285 of the device). The output of the classifier module 299 may be used by an application (e.g., application 291 may execute on the device 100 and may be an exercise program, activity logger, calendar application, or other software to read sensor data classifications). While application 291 is illustrated separate from other elements in the device 100, the application 291 may be wholly or partially implemented by other elements illustrated in FIG. 1, for example in the processor 101 and/or memory 105, or in another processor and/or memory of the device 100 or in one or more other elements of the device 100.

In some embodiments, to balance utility with power consumption, the classifier module 299 can implement a low-power consumption mode while providing accurate classification of input sensor data. In one embodiment, instead of reducing power consumption by removing functionality (e.g., reducing the number of features available), the classifier module 299 can schedule processing of features in a power efficient manner while maintaining overall device functionality.

Features, as used herein refer to the result or output of computations executed on data (e.g., a target data set from a sensor or other input). Features can be used to classify a data set. For example, upon performing computation on accelerometer data to determine one or more features, the resulting features can be analyzed to classify the accelerometer data (e.g., to determine that the accelerometer data likely indicates running motion was detected).

In one embodiment, the classifier module 299 may call or receive data from the scheduling module 295 as described in greater detail below. The scheduling module 295 can efficiently schedule features for computing by a processor, such that un-necessary feature computation can be reduced or avoided. For example, instead of computing all features associated with a sensor data sample, the scheduling module 295 can determine a power efficient processing schedule of feature computation such that power intensive computations are strategically reduced or minimized. In one embodiment, the scheduling module 295 or classifier module 299 can receive or access feature power usage estimations (e.g., from the power profile module 290).

In one embodiment, one or more features may be computed sequentially. For example, each feature in a set or series of features may be computed one at a time (e.g., serially) until a termination condition is reached. In some embodiments, a plurality of features may be computed at a certain step or level of the sequence. For example, the classifier 299 can compute one or more features until computing a feature to unambiguously classify a sensor data sample. In one embodiment, classification is unambiguous when a feature is compared to a training data set and the feature approximately matches (e.g., is within a threshold of) a previously calculated result determined to be associated with a particular classification. Features and related computations are described in further detail below.

Figure 3:
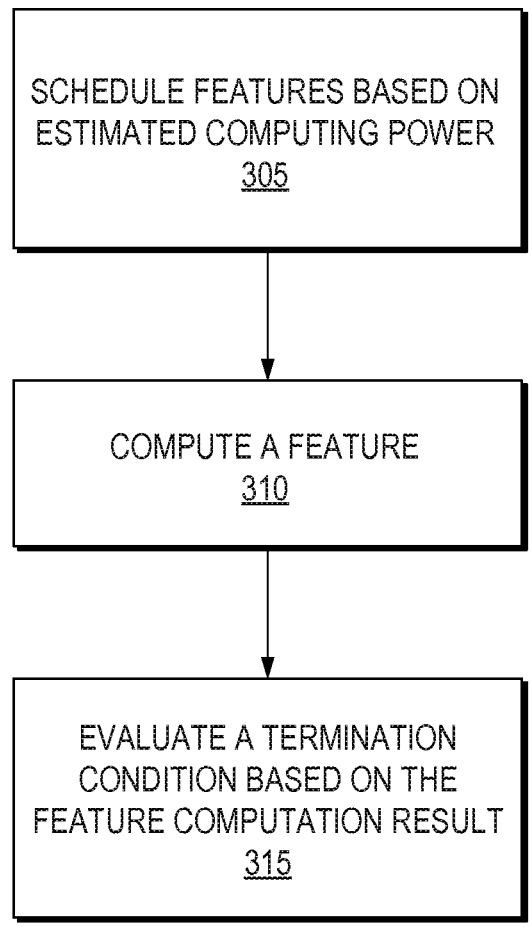
FIG. 3 illustrates a flow diagram of sequential feature computation, in one embodiment.

FIG. 3 illustrates a flow diagram of sequential feature computation, in one embodiment. At block 305, the scheduling module 295 schedules features based at least in part on each feature's estimated computing power usage. In some embodiments, scheduling computation of a feature may be referred to as scheduling that feature, or as some other like terminology. For example, feature A may be scheduled ahead of feature B because feature A has a lower estimated computing power usage profile than feature B. In other embodiments, the classifier module 299, or a combination of the classifier module 299 and the scheduling module 295 may provide scheduling. Scheduling features is described in greater detail below.

At block 310, the classifier module 299 may compute a feature. For example, the first feature may be the mean and/or standard deviation of raw data from an accelerometer, for example the accelerometer 140, or the first Mel-Frequency Cepstral Coefficient of raw data from a microphone, for example the microphone 165. Examples of computing features are described in greater detail below.

At block 315, the classifier module 299 may evaluate a termination condition based on the computed feature. For example, the evaluating of a termination condition can involve computing a confidence value and determining that the termination condition is met when the confidence value is greater than a threshold confidence value. In one embodiment, the threshold confidence value can be determined by comparing the feature with a training data set. In one embodiment, determining that the feature provides a high confidence value classification enables the classifier module 299 to exit (e.g., skip the computation of the remaining scheduled features) and output the classification. In one embodiment, the classifier module 299 iterates through multiple features until a high confidence value classification is determined.

Sensor Data

In one embodiment, the device may read or receive data from one or more integrated or external sensors (e.g., one or more of the sensors 285 and inputs described above). The device can receive external sensor data from communicatively connected external devices (e.g., via a USB connection or WiFi connection to an external camera) through the I/O controller 125. The device can receive raw sensor data for use in feature computation as described below. In other embodiments, an intermediary device or program can pre-process sensor data before feature computation by the device. For ease of description, sensor data as used herein refers to unprocessed data (e.g., data received from an accelerometer, ambient light sensor, microphone or other sensor). For example, data from an accelerometer may have attributes of time, acceleration along an x-axis, acceleration along a y-axis, and acceleration along a z-axis. As described above, however, sensor data may be received and processed in other forms in some embodiments.

The data from a sensor such as an accelerometer may be sampled at a particular frequency (e.g., 50 Hz, 60 Hz or other rate depending on the sampling device and the data requirements). In one embodiment, feature computation is performed on a moment, slice, or window of time selected from a stream or set of data from a sensor. For example, device can compute features from a one second time period selected from a longer stream (e.g., a ten second time period or some other time period) or sample of sensor data. For example, raw accelerometer data may be sampled at 60 Hz such that 1 second of data provides 60 3-dimensional accelerometer vector samples in the x-axis, y-axis, and z-axis for a net input size of 180 samples.

In one embodiment, the classifier module 299 can compare a sensor data sample to a training data sample (e.g., from a previously computed training set) to classify the sensor data sample.

Feature Computation

In one embodiment, a classifier (e.g., the classifier module 299) can compute, process, or extract one or more features from sensor data as disclosed above (e.g., raw data from a microphone, accelerometer, ambient light sensor or other input). For example, the classifier module can receive as input, raw sensor data (e.g., a sensor data sample) from accelerometer, and output mean and/or standard deviation. The mean and/or standard deviation can be used to determine a classification (e.g., walking, or sitting). In one embodiment, the features are the values, outputs, or results from computer code executed in memory 105 by a processor 101. Example features are described in greater detail below.

Power Profiling

In one embodiment, a power profile module can estimate power consumption of the device while a feature is computed. The power consumption may be pre-determined based on a training data set. For example, Feature A may be computed a number of iterations to estimate power usage while a device computes Feature A. This estimate may be performed on the device, or at another device and the power estimates transferred to the device. When scheduling the order or sequence of features, the power profile module can reference a historical or average power draw, battery charge loss, or other power usage representation. The power profile module may also compute other features to compare the estimated power usage of one feature to another feature. For example, the power profile module may compute Feature B a number of iterations to determine a power use specific to Feature B. This estimate may be performed on the device, or at another device and the power estimates transferred to the device. In yet other examples, a set or series of features are computed together or in parallel and power consumption of the entire set or series is recorded.

Different features or different sets of features may have different processing steps or different ordering of similar processing steps. The device can rank the order of individual features or sets of features from greatest power consumption to least power consumption. In one embodiment, the power profile for a feature is associated with the program or application code used to calculate the feature. In some embodiments, power profiling is conducted on a set or group of features. For example, instead of or in addition to profiling the estimated power usage for one feature, a set or group of features executed in parallel or sequentially and profiled as one set (e.g., power profile Z is associated with power usage of features 1, 2, and 3). Other programs or hardware, such as the classifier module, or scheduling module, can access the power profile. Alternatively, a power profile module or engine is integrated into the device, classifier module, or the scheduling module.

Figure 4:
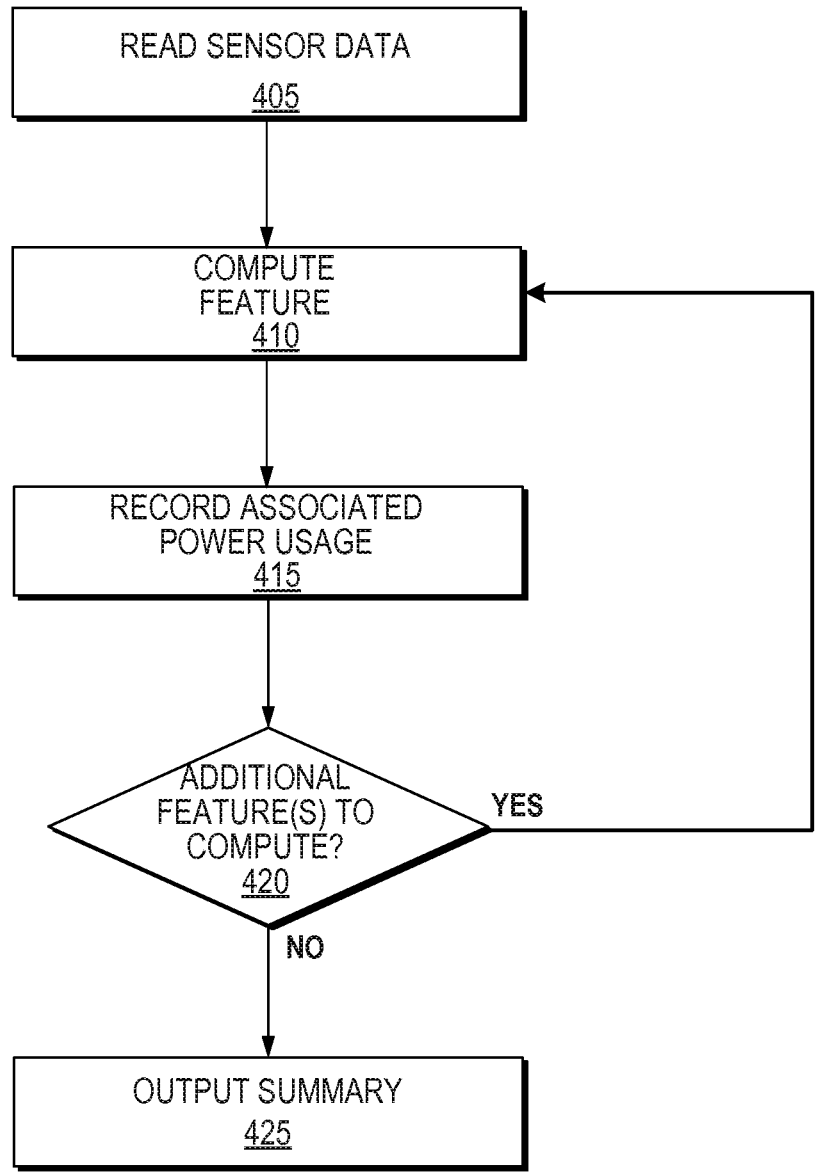
FIG. 4 illustrates a flow diagram of a process that may be performed by a power profile module, in one embodiment.

FIG. 4 illustrates a flow diagram of a process that may be performed by a power profile module, in one embodiment. At block 405, the power profile module can read sensor data.

At block 410, the power profile module can compute a feature based on the sensor data.

At block 415, the power profile module can estimate and record the power usage associated with computing a feature. In one embodiment, the power profile module may compute the same feature over multiple iterations and record the average power usage for the series of iterations.

At block 420, the power profile module can determine whether to profile additional or different features by returning to block 410. In one embodiment, the features may be from different sensor data or the same sensor data as the initial feature computed previously at block 410.

At block 425, the power profile module can determine no further features are queued for profiling and can output a summary of the profiled features. For example, the power profile module may output a file or record with each feature profiled and an associated estimated power usage. In some embodiments, the classifier module and/or scheduling module can access the output summary and schedule features for processing based on the estimated historical power usage in the output summary.

In some embodiments, the power profiles are calculated on a separate device such as a training system or server, and the results of the power profiling on a training system are saved to a file or database for access by a power profile module coupled to a device (e.g., a portable device). A power profile module installed or coupled to a portable device may therefore access pre-determined or pre-computed power profiles and not have to compute or generate power profiles before scheduling features in some embodiments.

Training Data

In one embodiment, the classifier module can read training data to determine a baseline reference for classifying features. For example, the classifier module can compare feature Z with previous feature calculations associated with a class to determine if feature Z can accurately classify a sensor data sample.

Figure 5:
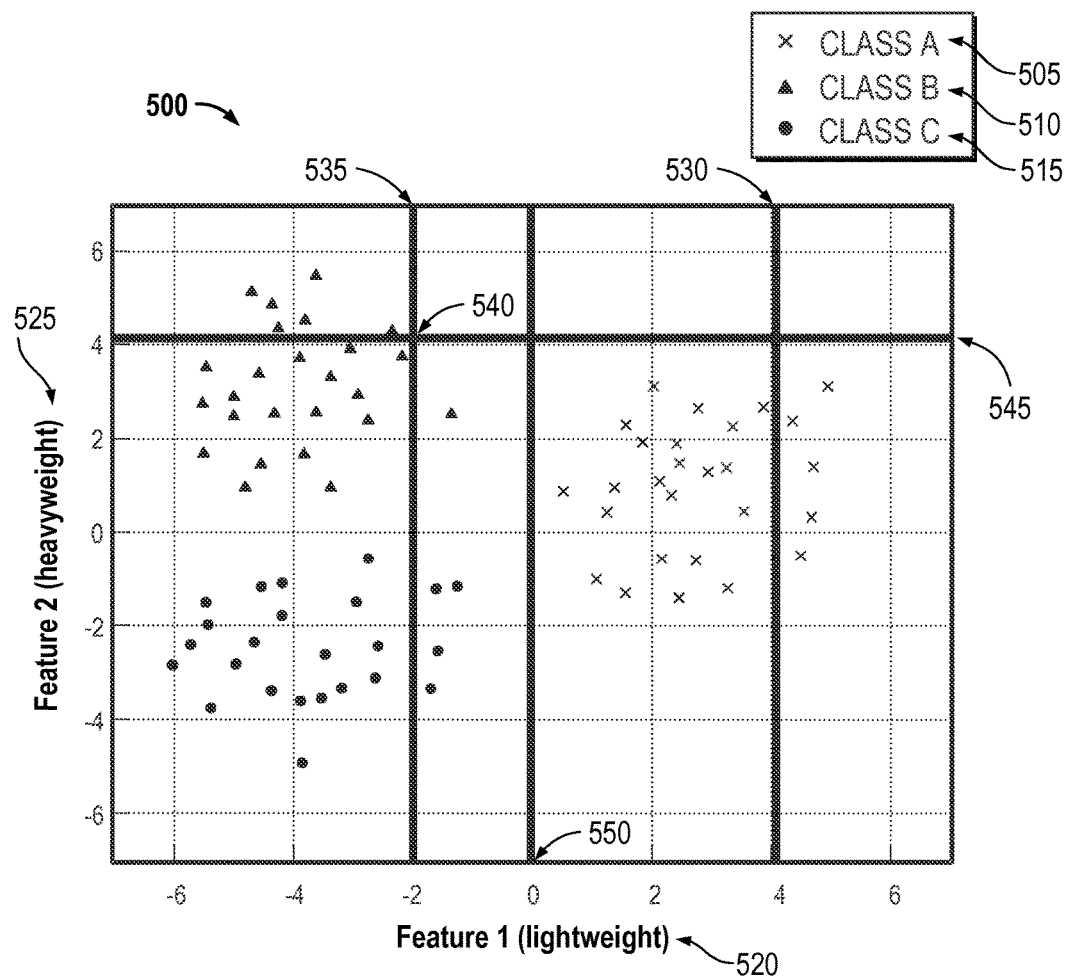
FIG. 5 is a chart illustrating training data for three classes in a feature space, in one embodiment.

FIG. 5 plots the training data for example classes A (505), B (510), and C (515) in the feature space, in one embodiment. In this example, the x-axis 520 represents data points for Feature 1 (e.g., results from computing Feature 1 from a data set). The y-axis 525 represents data points for Feature 2 (e.g., results from computing Feature 2 from a data set). In this example, Features 1 and 2 are used to classify the data points as belonging to one of the three classes. The first feature in this example is lightweight (e.g., low power usage) such that a processor can compute Feature 1 using relatively few operations or cycles compared to other features, resulting in lower power consumption compared to Feature 2. The second feature (Feature 2) is heavyweight, and may use more complex processor operations or have more cycles to execute, and relatively significant power usage compared to Feature 1.

FIG. 5 illustrates that Feature 1 can be useful for differentiating data points between class A and classes B and C. However, Feature 1 may not accurately differentiate class B from class C. Accordingly the classifier module can compute Feature 2 when Feature 1 is insufficient to determine a class with a high confidence. The classifier module can first compute Feature 1 (the lightweight feature 520) and can skip computing Feature 2 (the heavyweight feature 525) when there is a high confidence that Feature 1 is sufficient to determine a class.

To further illustrate how power savings can be achieved in one embodiment, FIG. 5 illustrates four example coordinates on the chart at x=4 (530), x=−2 (535), x=0 (550), and x,y=−2,4 (540).

The first example 530 illustrates a feature value of 4 after computing Feature 1. In this first example 530, the feature value of 4 is represented on the chart as a line in the feature space (illustrated by the line 530 intersecting the x-axis at value 4). In one embodiment, the nearest neighbor classifier uses training data samples and proximity to determine a classification. Nearest neighbor classifier can directly classify the data and yield a high confidence in class A because the nearest data points (closest values to 4 on the x-axis) to the result of Feature 1 (value 4) are associated with class A (represented by the data points clustered in the middle right portion of the chart in FIG. 5). Therefore, class A can be readily determined and assigned without computing Feature 2 when Feature 1 is 4. In this example, the power usage to compute Feature 2 is saved and device power consumption is reduced compared to a device that computes every feature for every class.

The second example 535 illustrates a result of −2 when computing Feature 1. In this second example, the feature value is a line in the feature space (illustrated by the line 535 intersecting the x-axis at −2). In this example, the value of Feature 1 is −2, and therefore determining a high confidence classification based on only Feature 1 is unlikely. Using the nearest neighbor classifier to directly classify the data yields a low confidence in class A because the nearest data points to the result of Feature 1 (value −2) are closer to class B and class C than class A. Furthermore, because the nearest neighbor classifier cannot with a high confidence determine whether class B or class C is the nearest neighbor, Feature 2 can then be computed. In this example, Feature 2 is computed resulting in the Feature 2 value of 4, represented in the chart as the point −2,4 (540). Point −2,4 (540) can be classified as class B with a high confidence because the nearest neighbors (e.g., based on training data) to point −2,4 (540) are associated with class B.

The third example 545 illustrates computing a Feature 2 value of 4 before computing Feature 1. In this third example 545, the Feature 2 value of 4 is represented on the chart as a line in the feature space (illustrated by the line 545 intersecting the y-axis at value 4). Nearest neighbor classifier can directly classify the data and yield a high confidence in class B because the nearest data points (closest values to 4 on the y-axis) to the result of Feature 2 (value 4) are associated with class B (represented by the data points clustered in the upper left portion of the chart in FIG. 5). Therefore, class B can be readily determined and assigned without computing Feature 1. In this third example, the power to compute Feature 1 can be saved and device power consumption is reduced compared to the device having to always compute Feature 1 after Feature 2.

The fourth example 550 illustrates a Feature 1 value of 0 before computing Feature 2. In this fourth example 550, the Feature 1 value of 0 is represented on the chart as a line in the feature space (illustrated by the line 550 intersecting the x-axis at value 0). In this example training set, Feature 1 with a value of 0 may not be classified with high accuracy without further feature processing. Using the nearest neighbor classifier to directly classify the data yields a low confidence in class A, B, and C because data points from class A, B, and C are all relatively close to the result of Feature 1 (classes A, B, and C all have at least one data point on or near x-axis value 0). Because the nearest neighbor classifier cannot with a high confidence determine whether class A, B, or C is the nearest neighbor based on only Feature 1, Feature 2 may be computed. In other embodiments, if a single feature cannot accurately provide a classification, a new sensor data sample can be obtained for a different moment in time and the feature can be recomputed and/or additional features can be computed, for example based on the new sensor data sample. The new sensor data sample may comprise data from the same sensor that provided data for calculating Feature 1 and/or data from one or more additional sensors. In some embodiments, a feature can be computed multiple times for multiple points in time before computing a next feature. In other embodiments, when a feature is unlikely to result in an accurate classification, a next feature is automatically computed until all features are computed and a best estimation of classification based on one or more of the computed features may be determined.

In one embodiment, when a classification cannot be accurately determined from a first feature computation, the device can compute the second feature and make a classification decision utilizing both features or just the second feature. Power is saved in circumstances where the first feature is sufficient to make an accurate class determination, skipping subsequent feature computation(s).

While some examples herein relate to skipping or bypassing a first feature in a two feature set, one of skill in the art will recognize that any number of features in a set or group of features can be skipped or bypassed using the techniques described herein. In some embodiments, one or more features can be skipped while a subsequent feature can be computed. For example, given a feature set of 1, 2, 3, 4, 5, features 2 and 4 may be skipped such that features 1, 3, and 5 are computed, saving the power usage required to compute features 2 and 4. In another example, features 1, 2, and 3 may be skipped or bypassed such that features 4, and 5 are computed.

In other embodiments, instead of directly using the training data to classify the data (e.g., nearest neighbor classifier described above), models pre-computed from the training data may be used (e.g., Support Vector Machines, Neural Network, Decision Tree, Bayesian Classifier, etc.).

Feature Scheduler

In one embodiment, the scheduling module 295 can adjust scheduling priority or position of one or more specific features for computation (e.g., to compute a feature earlier or later in a processing queue). The scheduling module 295 can arrange the processing (e.g., computation) order of the features to classify a sensor data sample. The scheduling module may receive a request, for example from an application; to differentiate between specific classifications (e.g., stationary, walking, running, fidgeting) so that the application can perform a classification related operation. In this example, the scheduling module can prioritize a feature to differentiate between stationary or moving as higher scheduling priority over features related to running, walking or other movement.

In one embodiment, the scheduling module can order or arrange features to compute based on one or more of: the desired classes to be discriminated between, the available training data, the relative frequencies of occurrence of each class, and/or the relative power required to compute each feature. The scheduling module may be a component of the classifier module or may be a standalone module or engine. In one embodiment, the scheduling module schedules feature for sequential or serial execution by a processor instead of in parallel or unscheduled execution.

The scheduling module can sequentially order features based on the desired classes to be discriminated between. For example, the scheduling module can determine that a sensor type is an accelerometer and, based on accelerometer output, a classification of stationary, walking, fidgeting, running can be determined. Therefore multiple different classifications can be determined based on determining the sensor is an accelerometer. Next, the scheduling module can determine the features associated with the different classifications. Mean and/or standard deviation can be used for determining whether the device and user are moving. Therefore, the scheduling module may order features such that the standard deviation is computed before other features that may not be able to accurately differentiate between possible classifications. Similarly, if the two classifications to be determined are only sitting and standing, the standard deviation may not be ordered first because the standard deviation may not provide any differentiation between the two possible classes.

The scheduling module can sequentially order features based on the relative frequencies of occurrence of each class. For example, the scheduling module can determine that walking is a classification that occurs more often than other classifications. Based on a determination that a device is stationary is more likely to occur than walking, running, or fidgeting, the scheduling module can schedule (for computation) the feature associated with determining whether a device is stationary, ahead of features associated with determining whether a data set represents walking, running, or fidgeting.

The scheduling module can also schedule feature computation based on a historical or pre-computed training data set. In one embodiment, the feature scheduler, e.g., the scheduling module, has access to probability data reporting the relative frequency of occurrence for each of the classes.

For example, if a training data set has shown a high likelihood of being able to differentiate between class X and class Y with only Feature 1, whereas Feature 2 is unable to differentiate between class X and class Y without the aid of feature 3, the scheduling module can prioritize Feature 1 for computation ahead of Feature 2 and feature 3.

In another example, the feature scheduler or scheduling module may determine that silence occurs with a greater frequency in training data samples than other classes (e.g., for example one person speaking or multiple people speaking). Therefore, the feature scheduler or scheduling module can prioritize the scheduling or computing of a feature associated with a high probability class such as silence. If power usage between features X and Y are the approximately the same, the feature scheduler or scheduling module may determine that feature X associated with a high probability class should be computed before feature Y associated with a lower probability class. In other embodiments, the probability that a class will occur in a sensor data sample can also be used to prioritize a heavyweight feature over a lightweight feature.

Using the example as above from FIG. 5, a sensor data sample from a device may be classified as class A, class B, or class C. Computing Feature 1 and Feature 2 together (sequentially or in parallel) can provide for an accurate classification of the target data set. However as disclosed above, Feature 1 is a lightweight computation and Feature 2 is a relatively heavyweight computation. Therefore, it can be beneficial to schedule Feature 1 for computing at a moment in time before Feature 2.

For example, when reading or using raw accelerometer data to classify a motion state as stationary, walking, fidgeting, or running, two or more features may be used. In this example, computing Feature 1, and computing Feature 2 each uses an amount of processing power (e.g., CPU cycles, watts, etc.). The estimated processing power usage associated with each feature can be based on the power profiling module and training data as previously described above.

To determine which features can provide accurate determinations for a particular class, each feature can be computed during a training data set and can be analyzed to determine which features can independently classify a particular class. For example, Feature 1 may be able to determine whether a device user is moving or stationary. In one embodiment, if Feature 1 determines the device is stationary, no further motion features are scheduled because a stationary device is by definition not walking, fidgeting or running. In other embodiments, if Feature 1 determines the device is stationary, further features related to device orientation may be calculated to determine if the stationary device is in a hand, pocket, table, or other position.

In one embodiment, if Feature 1 determines the device is moving (e.g., not stationary), additional features may be useful to further define whether a device is walking, fidgeting, running A lightweight feature (e.g., Feature 1) using less power than a heavyweight feature (e.g., Feature 2) may be computed first in isolation from other features to determine whether a classification can be determined. The heavyweight feature can start executing when it is determined that the first feature is unable to provide an accurate classification.

In one embodiment, the scheduling module can sequentially order features based on each feature's estimated computing power usage (e.g., the estimated usage from power profiling disclosed above). The estimated level of processing power can be determined by historical runs or pre-computed training data.

In other embodiments, the scheduling module can use a combination of one or more of the above disclosed scheduling methods to schedule features for computation.

In yet other embodiments, the scheduling module receives a predetermined order of features, or identifies an order which it previously determined, and can verify the order of features is performed in accordance with the received or identified order. For example, the scheduling module may read a prearranged feature set and schedule the features for execution by a processor or separate module (e.g., classifier module) in the correct order. The order may have been determined pursuant to the ordering and/or techniques described above. Thus, in some embodiments, scheduling (e.g., by the scheduling module 295) comprises scheduling features for execution pursuant to a received or previously determined order which may have been determined according to principles described herein.

Figure 6:
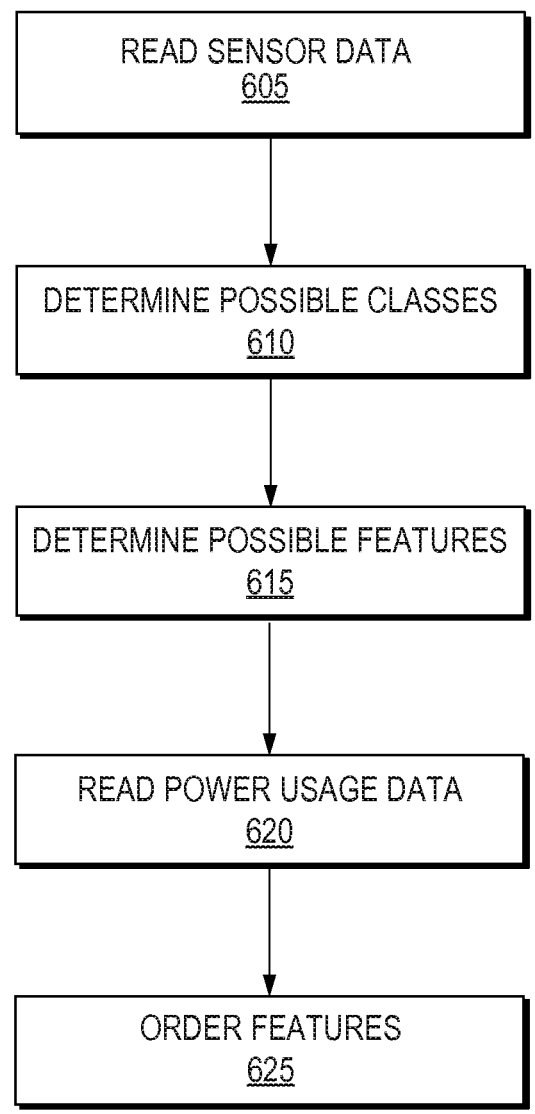
FIG. 6 illustrates a flow diagram of a process that may be performed by a scheduling module, in one embodiment.

FIG. 6 illustrates a flow diagram of a process that may be performed by a scheduling module, in one embodiment. At block 605, raw data can be read from a sensor. For example, scheduling module can read data from the accelerometer 140, microphone 165, ambient light sensor 135, or other sensor in the device.

At block 610, one or more possible classifications can be determined based on the type of sensor. For example, the scheduling module can determine that whether the user of a device is walking, how the user may be holding the device, whether the user of the device is talking, or other classification.

At block 615, features used for the classifications found in block 610 can be determined. For example, the scheduling module can determine that classifications A, B, and C are possible based on the sensor type and that features X, Y, and Z can classify the data from the sensor.

At block 620, power usage data can be read. In one embodiment, the classifier module or scheduling module can read or access the power usage data created by the power profile module.

At block 625, features are scheduled for processing or calculation. For example, scheduling module can order features X, Y, and Z for sequential processing by the processor 101 such that feature X is processed before Y, and Y is processed before Z. In one embodiment, the processing order is passed or sent to a classifier module or scheduling module for processing.

Motion State

In one embodiment, device can measure the motion of the device by measuring the output from one or more of the device sensors as disclosed above. The sensor data can be used to determine a motion state of the device. Device sensor data used for feature calculation can determine a variety of motion states (e.g., stationary, walking, fidgeting, driving, running, or similar).

Figure 7:
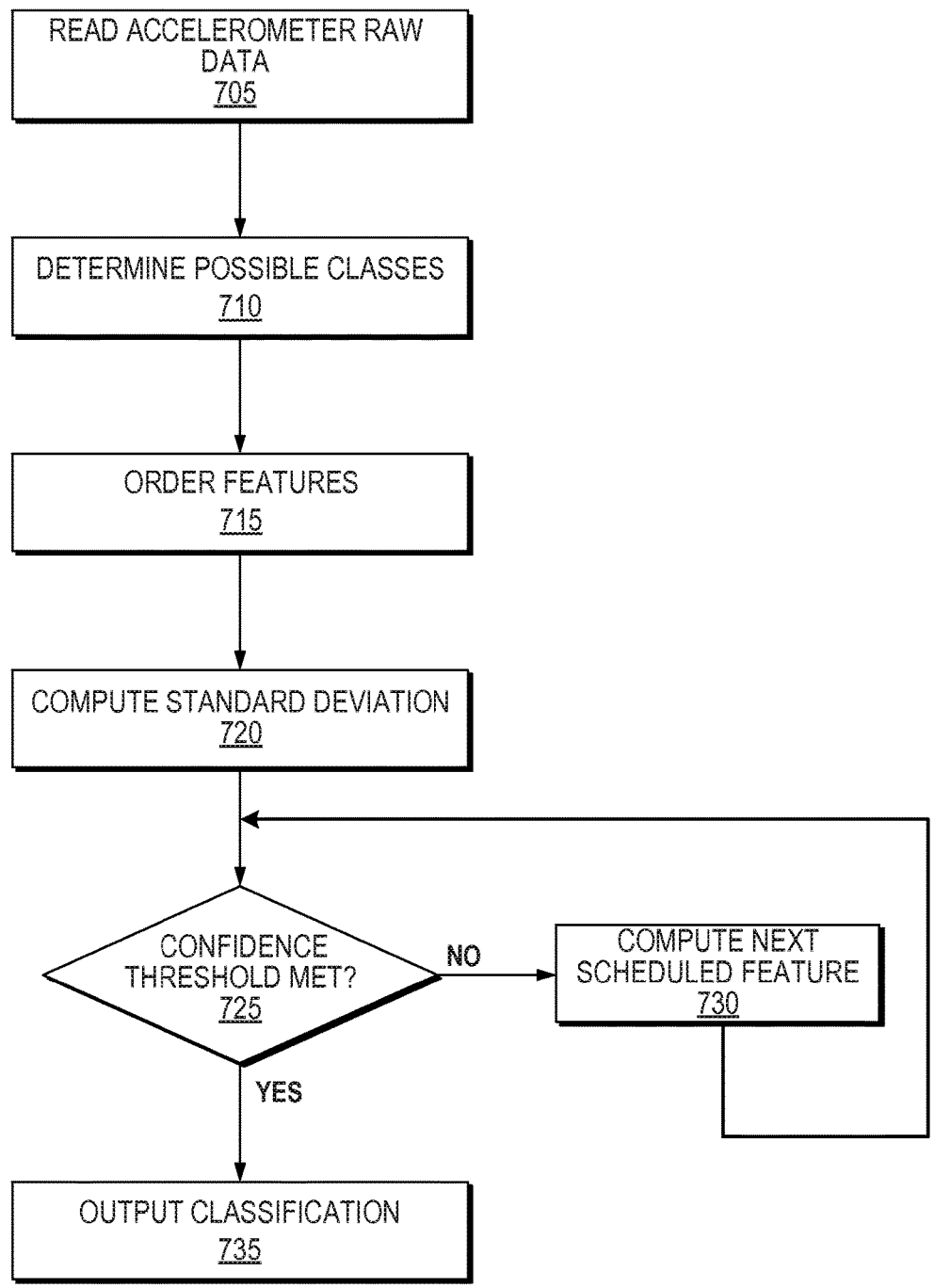
FIG. 7 illustrates a flow diagram of one embodiment of a method for processing features for motion state classification.

FIG. 7 illustrates a flow diagram of one embodiment of a method for scheduling features for motion state classification. At block 705, accelerometer raw data can be read from an accelerometer sensor (e.g., accelerometer 140). For example the scheduling module or the classifier module can read raw accelerometer data. In one embodiment, the scheduling or classifier module may be automatically triggered by a hardware or software interrupt when an accelerometer detects motion.

At block 710, one or more possible classifications possible from the accelerometer data can be determined. For example, scheduling module or the classifier module can determine motion states or classes of: stationary, walking, driving, fidgeting, running are possible.

At block 715, the features used to classify the sensor data can be ordered. For example, the scheduling module or the classifier module may use accelerometer data to determine the standard deviation of accelerometer and one axis of orientation of the device (pitch). The scheduling module or classifier module can determine that the standard deviation is estimated to use less power than pitch and schedule standard deviation for computation by the processor before pitch is scheduled.

At block 720, the standard deviation of the raw sensor data can be computed. For example, given 3D accelerometer vectors, the classifier module can compute their norms, and estimate the standard deviation of these norms. This feature is useful for discriminating between motion states such as sit/stand and walk as they are distinguishable by the varying degree of the accelerometer variation.

At block 725, a confidence value can be determined (e.g., by the classifier module). If the confidence value is above a threshold (e.g., device may set a confidence threshold based on user preferences or a default value) the classifier module proceeds to output the determined classification. In one embodiment, a confidence value may be computed by the classifier module based on statistical likelihoods $L_1$ and $L_2$ for the two nearest classes, such as:

$$C = \frac{\log(L_1) - \log(L_2)}{|\log(L_1) + \log(L_2)|} \qquad \text{Eq. 1}$$

In some embodiments, a confidence value for the classifier is computed based on training data and the features evaluated.

At block 730, the next feature can be computed (e.g., by the classifier module) if the confidence threshold for the previous feature is not met. For example, the next feature may be pitch, or orientation of the surface of the device with respect to gravity. This orientation can be characterized by two angles referred to as pitch and roll. Pitch is the rotation around the x-axis and ranges from $(-\pi, \pi]$. The average pitch is computed by first averaging the accelerometer vector and then computing the pitch such as:

$$ap = a\tan2\left(\frac{1}{N}\sum_{n=1}^{N} a_y(n), \frac{1}{N}\sum_{n=1}^{N} a_z(n)\right) \qquad \text{Eq. 2}$$

and accelerometer samples are: $a(n)=(a_x(n)\ a_y(n)\ a_z(n))$ with N as the number of vector samples in the window over which a feature is computed (e.g., 60 for a 60 Hz sample).

Pitch can be used to discriminate between sitting and standing when the device is in the pant pocket and to a lesser degree, hand, as well as for determining device position, for example.

In one embodiment, the second or additional accelerometer related feature may be associated with a pedometer. For example, the first feature (e.g., standard deviation) may determine the device is moving (i.e., non-stationary). However, the classifier module may not have enough confidence based on only the standard deviation to differentiate between walking and running. Therefore, further pedometer calculations can be performed on the sensor data sample after the lightweight standard deviation has determined with high confidence that movement is detected.

In one embodiment, upon determining (e.g., based on data from the accelerometer) a moving or non-stationary state, the classifier module may further determine (e.g., with one or more features associated with a pedometer classifier) whether any steps are detected (e.g., walking or running). If no steps are detected, the classifier module may further classify the data (e.g., accelerometer sensor data) with one or more features associated with a full-motion classifier. The full-motion classifier may be able to determine whether the drive motion or unknown/fidget state has a high confidence.

In one embodiment, upon determining a stationary motion state, the classifier module may further determine (e.g., with features associated with a pedometer classifier) whether the stationary state is pedestrian stationary state.

In some embodiments, upon determining with one or more pedometer related features that walking or running is the likely classification (i.e., have high confidence) at block 725, the walking or running classification may be output at block 735.

Figure 7B:
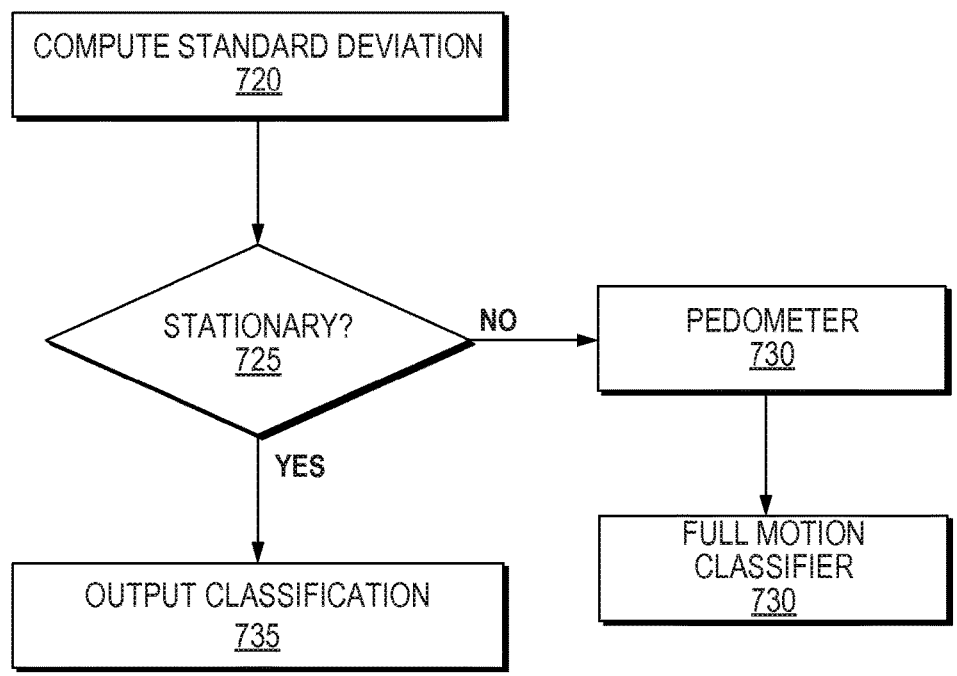
FIG. 7B illustrates a flow diagram of one embodiment of a method for processing features for motion state classification.

In other embodiments, upon determining from the one or more pedometer features, that walking or running is unlikely (i.e., have low confidence) at block 725, additional features related to a full motion classifier may be scheduled at block 730, shown in FIG. 7B. For example, features of a full motion classifier may determine whether driving, or unknown/fidget classifications is appropriate (i.e., have high confidence).

In one embodiment, if the second feature does not meet the confidence threshold at block 725, the classifier module can continue to calculate additional features until a finalized output can be determined.

At block 735, a classification for the raw sensor data can be output based on previously computed feature(s). For example, the classifier module may determine with a high confidence that the device motion state is walking, and the result can be output or sent to a requesting program or application.

In some embodiments, when the standard deviation of the accelerometer indicates with a high confidence that the device is stationary (e.g., not moving), all subsequent scheduled features are automatically cancelled or stopped. For example, if the accelerometer detects the device is stationary, further calculations to determine whether the user and device are walking, running, driving, or fidgeting may be superfluous. In some embodiments, additional motion based sensors (e.g., gyroscope, GPS, or other) associated features may also be cancelled or left uncalculated when a stationary classification is determined by an accelerometer or other first sensor.

In other embodiments, when a first feature of the accelerometer may determine with high confidence that the device is stationary further feature calculations may nonetheless be calculated in order to calculate device positioning (e.g., in pocket, hand, on table, or other position). In one embodiment an application or program requesting feature computation and classification may request further classification beyond the stationary classification.

A person of skill in the art will recognize other features can be computed and scheduled in a power efficient manner as described herein, and that standard deviation and pitch are used merely as an example herein to illustrate one embodiment.

Speech Detection

In another embodiment, audio data (e.g., data from microphone 165) is used to determine a classification for the sensor data sample.

Figure 8:
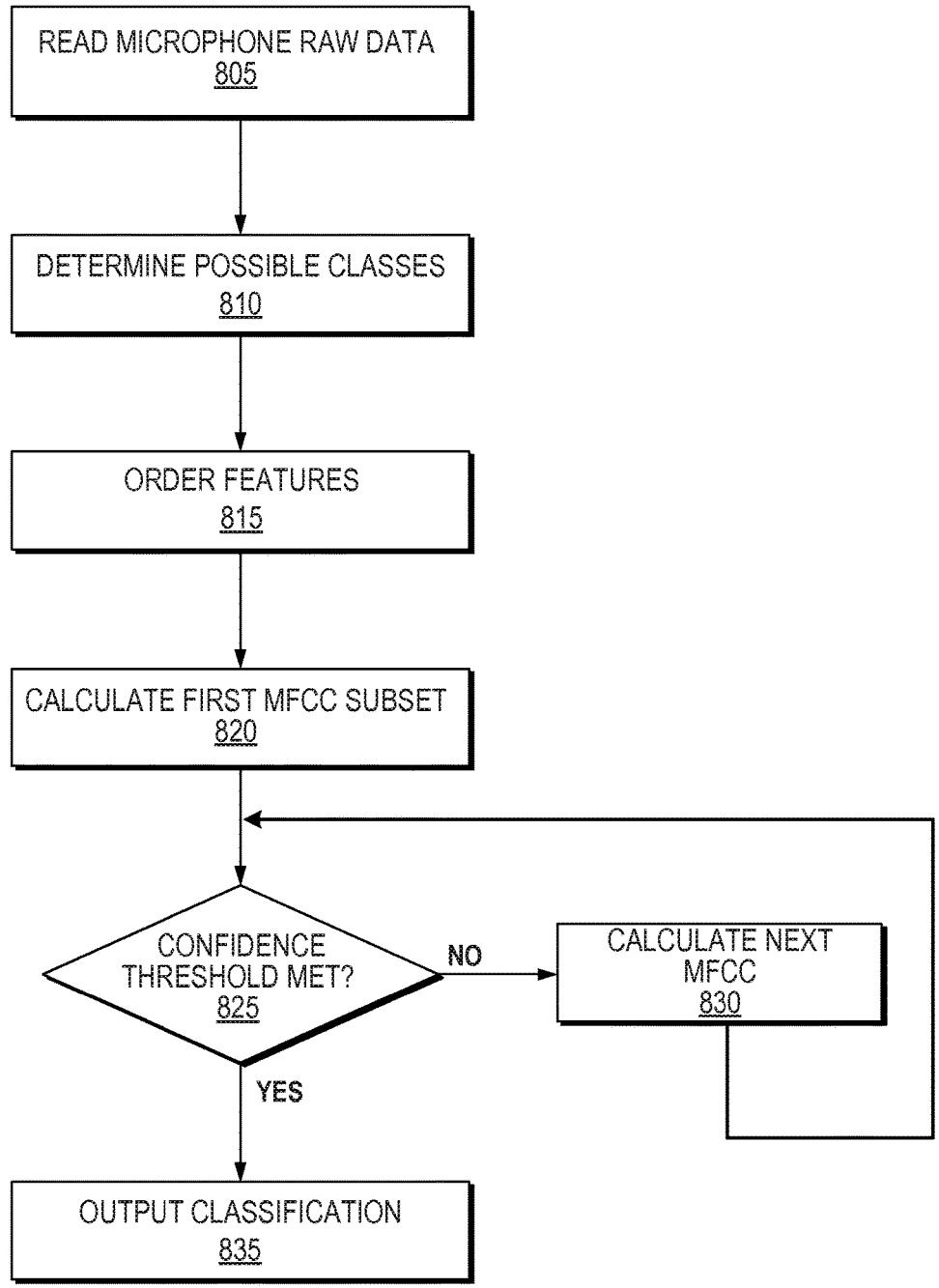
FIG. 8 illustrates a flow diagram of one embodiment of a method for processing features for speech detection.

FIG. 8 illustrates a flow diagram of one embodiment of a method 800 for scheduling features for speech detection. At block 805, raw data from a microphone (e.g., microphone 165) can be read (e.g., by the classifier module or scheduling module).

At block 810, one or more possible classifications possible from the microphone data can be determined. For example, speech states or classes of: quiet, speech from one speaker, speech from multiple speakers, or similar can be determined by the classifier module or the scheduling module.

At block 815, features used to classify the microphone data can be ordered for processing. For example, the scheduling module, or the classifier module may determine that Mel-Frequency Cepstral Coefficients (MFCCs) will be used to classify the sensor data sample. In one embodiment, 13 MFCCs are computed for speech detection; however one of skill in the art will recognize different configurations are also possible. The $1^{st}$ MFCC can correspond to the audio energy (or volume), while the remaining MFCCs can correspond to determining whether there is speech from one or more speaker. In one embodiment, the features are separated into subsets such that feature subset 1 includes the $1^{st}$ MFCC and feature subset 2 includes MFCCs 2 through 13. In one embodiment, the classifier module or scheduling module determines (e.g., from a power profile) that subset 1 has a lower estimated computing power usage compared to subset 2 and schedules feature subset 1 ahead of feature subset 2. Scheduling or ordering subset 1 to compute before subset 2 can result in a power savings when a classifying based on subset 1 and avoiding the computation of one or more of subset 2 (MFCCs 2-13).

At block 820, the feature subset 1 of the raw sensor data can be computed (e.g., by the classifier module). The $1^{st}$ MFCC can be useful for discriminating between whether there is quiet or possible speech from the microphone data.

At block 825, a confidence value can be calculated (e.g., by the classifier module). If the confidence value is above a threshold (e.g., device or classifier module may set a confidence threshold based on user preferences or a default value) the classifier module proceeds to output the determined classification. In one embodiment, a confidence value may be computed as described above based on statistical likelihoods $L_1$ and $L_2$ for the two nearest classes.

At block 830, if the confidence threshold for the feature subset 1 was not met, the next feature subset can be computed (e.g., by the classifier module). In the case of speech detection, feature subset may be one of a number of additional MFCCs (e.g., 2-13) for computation. In one embodiment, if the next MFCC feature does not meet the confidence threshold at block 825, the classifier module can continue to calculate additional features until a finalized output can be determined.

At block 835, classification for the raw sensor data based on previously computed feature(s) can be output. For example, if the classifier module determines with a high confidence that the speech from one speaker is detected, the result is output or sent to a requesting program or application.

A person of skill in the art will recognize other features can be computed and scheduled in a power efficient manner as described herein, and that MFCC subsets are used merely as an example herein to illustrate one embodiment.

Device Position

In another embodiment, device position data (e.g., data from an accelerometer 140) can be used to determine a classification for the sensor data sample.

Figure 9:
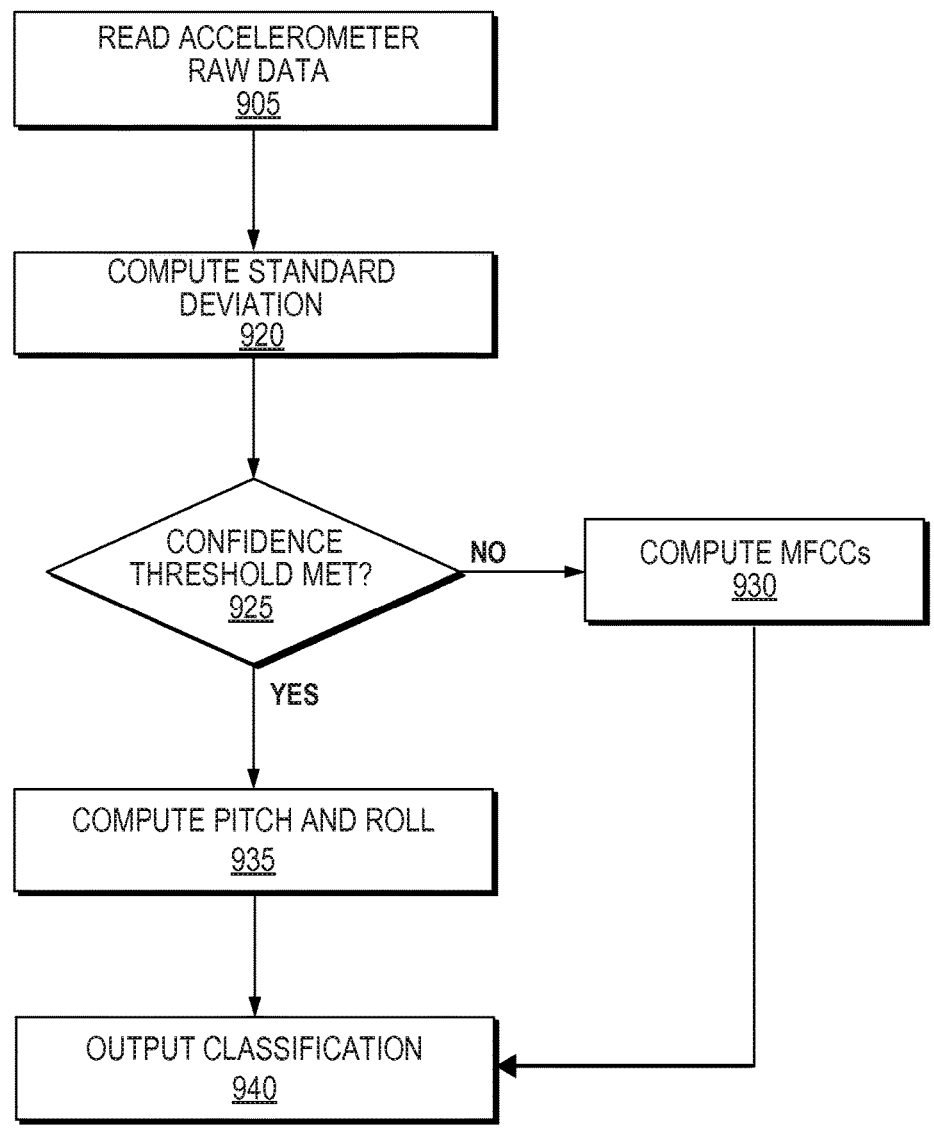
FIG. 9 illustrates a flow diagram of one embodiment of a method for processing features for determining device position.

FIG. 9 illustrates a flow diagram of one embodiment of a method 900 for scheduling features for determining device position. At block 905, raw data can be read (e.g., by the classifier module) from an accelerometer, for example the accelerometer 140.

At block 920, the standard deviation of the raw accelerometer sensor data can be computed (e.g., by the classifier module).

At block 925, a confidence value can be calculated (e.g., by the classifier module). If the standard deviation is large and does not meet the confidence threshold, the next feature can be computed at block 930. Otherwise, if the confidence threshold is met (e.g., the standard deviation is small, suggesting the device is at rest), pitch and average roll can be calculated (e.g., by the classifier module) at block 935.

At block 930, if the confidence threshold was not met for the standard deviation computed in block 920, the 13 MFCCs can be computed (e.g., by the classifier module). The 13 MFCCs characterize the spectral envelope of the signal and can be used to determine device position when the device is in motion.

At block 940, a classification for the raw sensor data based on previously computed feature(s) can be output (e.g., by the classifier module).

A person of skill in the art will recognize other features can be computed and ordered for computation in a power efficient manner as described herein and features, sensors and computations disclosed above are just a few examples to illustrate various embodiments. In other embodiments, multiple features and iterations of feature computation are possible.

In yet other embodiments, a classifier module can use multiple sensors to determine a classification. When multiple sensors are used, sensor data can be activated or processed sequentially as described above such that power intensive computations are strategically reduced or minimized. For example, a first feature can be calculated based on activation and processing of data from a first sensor. If the first sensor data and feature computation can provide an accurate classification, other sensors and associated features may be bypassed or left unprocessed. If the first sensor data and feature computation are determined to provide a classification below a target confidence, however, other sensors may be used to collect additional sensor data and associated features may be processed based on the additional sensor data and/or the first sensor data in some embodiments. For example, the scheduling module 295 may determine an order in which to utilize sensors and/or collect measurements or sensor data, for example based on information from the power profile module 290. In some embodiments, information from the classifier module 299 may be fed back into the scheduling module 295 to determine whether to collect addition information and/or which sensors to use.

Figure 10:
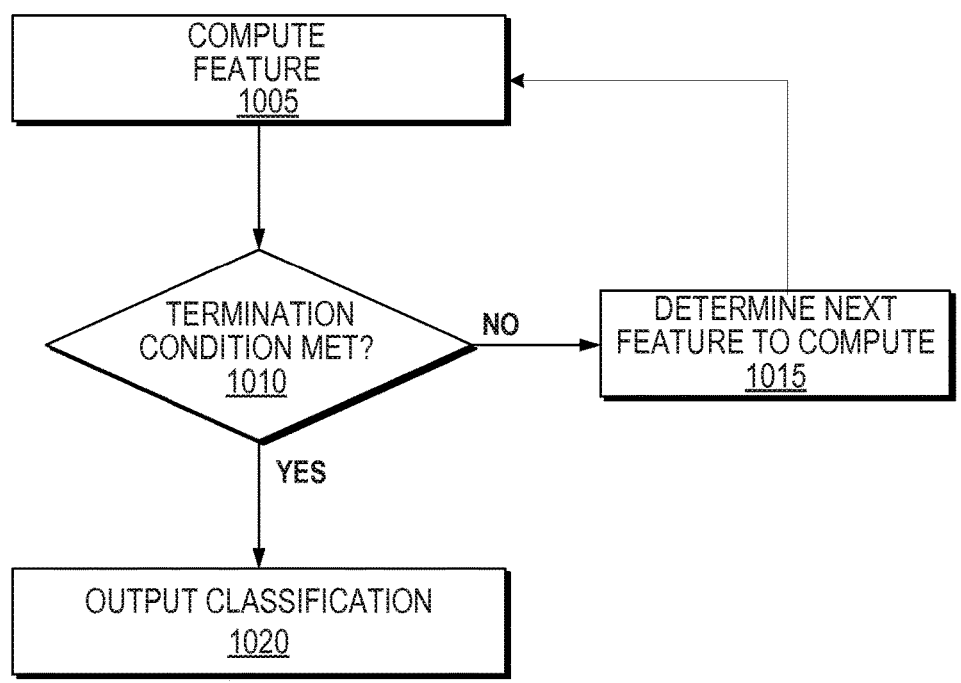
FIG. 10 illustrates a flow diagram of one embodiment of a method for sensor data classification.

FIG. 10 shows a flow diagram of one embodiment of a method for feature classification. At block 1005, a scheduled feature (e.g., standard deviation of raw data from an accelerometer or the first Mel-Frequency Cepstral Coefficient of raw data from a microphone) can be computed by the classifier module. The scheduled feature may be scheduled as described previously (e.g., sequentially ordered by a scheduling module based on power consumption, or other scheduling parameters as disclosed).

At block 1010, a determination can be made as to whether a termination condition is met. For example, based on the result of computing the feature from block 1005, the device (or the classifier module) can evaluate a termination condition based on the computed first feature. For example, evaluating a termination condition can include computing a confidence value (e.g., as disclosed above, confidence may be based on statistical likelihoods, training data, or other calculations) and determining the termination condition is met when the confidence value is greater than a threshold confidence value. In one embodiment, determining that the first feature provides a high confidence value classification enables the optimized classifier to exit (e.g., skip the computation of the remaining scheduled features) and output the classification.

At block 1015, if a confidence threshold was not met the next feature to compute can be determined. For example, the classifier module may determine the feature most likely to classify the target data may be scheduled, or the feature with the lowest estimated power consumption. Other scheduling options are described above. If the confidence threshold is met, a classification can be output at block 1020. In one embodiment, the classifier module can compute features sequentially such that once a feature provides a result to meet the confidence threshold, the classifier module can output a classification without computing any remaining scheduled features. For example, the classifier module may process 2 of 10 possible features and before determining a confidence threshold is met, may bypass the remaining 7 feature computations to output a classification.

It should be appreciated that when the device is a mobile or wireless device that it may communicate via one or more wireless communication links through a wireless network that are based on or otherwise support any suitable wireless communication technology. For example, in some aspects computing device or server may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an Electrocardiography (EKG) device, etc.), a user I/O device, a computer, a server, a point-of-sale device, an entertainment device, a set-top box, or any other suitable device. These devices may have different power and data requirements and may result in different power profiles generated for each feature or set of features.

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
   receiving, by a processor, a sensor data sample from one or more sensors;
   determining, by a processor, a classification associated with the sensor data sample based in part on the data sample and a type of each of the one or more sensors;
   determining, by a processor, an estimated amount of power required by the processor to compute each of a plurality of features associated with the sensor data sample based in part on one or more prior feature calculations associated with the classification;
   determining, by the processor, a sequential schedule for computing the plurality of features associated with the sensor data sample, wherein each of the plurality of features is computed based in part on data received by the processor from the one or more sensors, and wherein the schedule is determined based at least in part on the type of each of the one or more sensors and the estimated amount of power required to compute each of the plurality of features;
   computing, by the processor, a first feature according to the sequential schedule; and
   determining, by the processor, whether a termination condition is satisfied before computing a second feature in the sequential schedule.

2. The method of claim 1, further comprising:
   determining, by the processor, the computing of the first feature satisfies the termination condition; and
   classifying, by the processor, the sensor data sample based on a result of the computing of the first feature.

3. The method of claim 1, further comprising:
   determining, by the processor, the computing of the first feature fails to satisfy the termination condition;
   computing, by the processor, upon a failure of the first feature to satisfy the termination condition, the second feature in the sequential schedule for computing the plurality of features for computing;
   determining, by the processor, the computing of the second feature satisfies the termination condition; and
   classifying, by the processor, the sensor data sample according to results of computing the first and second features.

4. The method of claim 1, wherein the sequential schedule for computing a plurality of features is further determined based on one or more of: a likelihood of each feature resulting in an unambiguous classification, or a relative frequency of occurrences of classes being classified from the sensor data sample.

5. The method of claim 1, wherein determining the termination condition is satisfied comprises determining that a classification confidence meets a threshold value, wherein the classification confidence is based on one or more of: a similarity between a feature of the sensor data sample with a feature of a training data sample, or a difference in likelihood between a plurality of possible classifications.

6. The method of claim 1, wherein the first feature is a mean or standard deviation of an accelerometer, wherein computing the mean or standard deviation results in a stationary classification, and wherein the method further comprises cancelling computation of subsequent motion related feature computation.

7. The method of claim 1, wherein the first feature is a Mel-Frequency Cepstral Coefficient corresponding to audio energy from a microphone, wherein computing the Mel-Frequency Cepstral Coefficient results in a quiet classification, and wherein the method further comprises cancelling computation of subsequent audio related feature computation.

8. The method of claim 1, wherein the sensor data sample is from one or more of: an accelerometer, a gyroscope, a magnetometer, a barometric pressure sensor, a temperature sensor, a global positioning sensor, a WiFi sensor, a Bluetooth sensor, an ambient light sensor, a camera, or a microphone.

9. A machine readable non-transitory storage medium containing executable instructions which cause a data processing device to perform a method comprising:
  receiving, by a processor, a sensor data sample from one or more sensors;
  determining, by a processor, a classification associated with the sensor data sample based in part on the data sample and a type of each of the one or more sensors;
  determining, by a processor, an estimated amount of power required by the processor to compute each of a plurality of features associated with the sensor data sample based in part on one or more prior feature calculations associated with the classification;
  determining, by the processor, a sequential schedule for computing the plurality of features associated with the sensor data sample, wherein each of the plurality of features is computed based in part on data received by the processor from the one or more sensors, and wherein the schedule is determined based at least in part on the type of each of the one or more sensors and the estimated amount of power required to compute each of the plurality of features;
  computing, by the processor, a first feature according to the sequential schedule; and
  determining, by the processor, whether a termination condition is satisfied before computing a second feature in the sequential schedule.

10. The machine readable non-transitory storage medium of claim 9, wherein the method further comprises:
  determining, by the processor, the computing of the first feature satisfies the termination condition; and
  classifying, by the processor, the sensor data sample based on a result of the computing of the first feature.

11. The machine readable non-transitory storage medium of claim 9, wherein the method further comprises:
  determining, by the processor, the computing of the first feature fails to satisfy the termination condition;
  computing, by the processor, upon a failure of the first feature to satisfy the termination condition, the second feature in the sequential schedule for computing the plurality of features for computing;
  determining, by the processor, the computing of the second feature satisfies the termination condition; and
  classifying, by the processor, the sensor data sample according to results of computing the first and second features.

12. The machine readable non-transitory storage medium of claim 9, wherein the sequential schedule for computing a plurality of features is further determined based on one or more of: a likelihood of each feature resulting in an unambiguous classification, or a relative frequency of occurrences of classes being classified from the sensor data sample.

13. The machine readable non-transitory storage medium of claim 9, wherein determining the termination condition is satisfied comprises determining that a classification confidence meets a threshold value, wherein the classification confidence is based on one or more of: a similarity between a feature of the sensor data sample with a feature of a training data sample, or a difference in likelihood between a plurality of possible classifications.

14. The machine readable non-transitory storage medium of claim 9, wherein the first feature is a mean or standard deviation of an accelerometer, wherein computing the mean or standard deviation results in a stationary classification, and wherein the method further comprises cancelling computation of subsequent motion related feature computation.

15. The machine readable non-transitory storage medium of claim 9, wherein the first feature is a Mel-Frequency Cepstral Coefficient corresponding to audio energy from a microphone, wherein computing the Mel-Frequency Cepstral Coefficient results in a quiet classification, and wherein the method further comprises cancelling computation of subsequent audio related feature computation.

16. The machine readable non-transitory storage medium of claim 9, wherein the sensor data sample is from one or more of: an accelerometer, a gyroscope, a magnetometer, a barometric pressure sensor, a temperature sensor, a global positioning sensor, a WiFi sensor, a Bluetooth sensor, an ambient light sensor, a camera, or a microphone.

17. A data processing device comprising:
  a classification module configured to receive a sensor data sample from one or more sensors and determine a classification associated with the sensor data sample based in part on the data sample and a type of each of the one or more sensors;
  a power profile module configured to determine an estimated amount of power required by a processor to compute each of a plurality of features based in part on one or more prior feature calculations associated with the classification;
  a scheduling module configured to receive sensor data from the one or more sensors, determine a sequential schedule for computing, the plurality of features for computing, wherein each of the plurality of features is computed by a processor based in part on data received from the one or more sensors, and wherein the schedule is determined based at least in part on the type of each of the one or more sensors and the estimated amount of power required by the processor to compute each of the plurality of features; and
  a classifier module to compute a first feature in the sequential schedule and determine whether a termination condition is satisfied before computing a second feature in the sequential schedule.

18. The data processing device of claim 17, wherein the classifier module is further configured to:
  determine the computing of the first feature satisfies the termination condition;
  and
  classify the sensor data sample based on a result of the computing of the first feature.

19. The data processing device of claim 17, wherein the classifier module is further configured to:
  determine the computing the first feature fails to satisfy the termination condition;
  compute, upon a failure of the first feature to satisfy the termination condition, the second feature in the sequential schedule for computing the plurality of features for computing;
  determine the computing the second feature satisfies the termination condition; and
  classify the sensor data sample according to results of computing the first and second features.

20. The data processing device of claim 17, wherein the sequential schedule for computing a plurality of features is further determined based on one or more of: a likelihood of each feature resulting in an unambiguous classification, or a relative frequency of occurrences of classes being classified from the sensor data sample.

21. The data processing device of claim 17, wherein the classifier module is configured to determine the termination condition is satisfied based on a classification confidence meeting a threshold value, wherein the classification confidence is based on one or more of: a similarity between a feature of the sensor data sample with a feature of a training data sample, or a difference in likelihood between a plurality of possible classifications.

22. The data processing device of claim 17, wherein the scheduling module is further configured to:
cancel computation of subsequent motion related feature computation upon determining the first feature is a mean or standard deviation of an accelerometer resulting in a stationary classification.

23. The data processing device of claim 17, wherein the scheduling module is further configured to:
cancel computation of subsequent audio related feature computation upon determining the first feature is Mel-Frequency Cepstral Coefficient corresponding to audio energy from a microphone resulting in a quiet classification.

24. The data processing device of claim 17, wherein the sensor data sample is from one or more of: an accelerometer, a gyroscope, a magnetometer, a barometric pressure sensor, a temperature sensor, a global positioning sensor, a WiFi sensor, a Bluetooth sensor, an ambient light sensor, a camera, or a microphone.

25. An apparatus comprising:
means for receiving sensor data sample from one or more sensors;
means for determining a classification associated with the sensor data sample based in part on the data sample and a type of each of the one or more sensors;
means for determining, an estimated amount of power required by a processor to compute each of a plurality of features associated with the sensor data sample based in part on one or more prior feature calculations associated with the classification;
means for determining a sequential schedule for computing the plurality of features associated with the sensor data sample, wherein each of the plurality of features is computed based in part on data received from the one or more sensors, and wherein the schedule is determined based at least in part on the type of each of the one or more sensors and the estimated amount of power required to compute each of the plurality of features;
means for computing a first feature according to the sequential schedule; and
means for determining whether a termination condition is satisfied before computing a second feature in the sequential schedule.

26. The apparatus of claim 25, further comprising:
means for determining the computing of the first feature satisfies the termination condition; and
means for classifying the sensor data sample based on a result of the computing of the first feature.

27. The apparatus of claim 25, further comprising:
means for determining the computing of the first feature fails to satisfy the termination condition;
means for computing, upon a failure of the first feature to satisfy the termination condition, the second feature in the sequential schedule for computing the plurality of features for computing;
means for determining the computing of the second feature satisfies the termination condition; and
means for classifying the sensor data sample according to results of computing the first and second features.

28. The apparatus of claim 25, wherein the means for determining a sequential schedule for computing the plurality of features is configured to further determine the sequential schedule for computing the plurality of features based on one or more of: a likelihood of each feature resulting in an unambiguous classification, or a relative frequency of occurrences of classes being classified from the sensor data sample.

29. The apparatus of claim 25, wherein determining the termination condition is satisfied comprises determining that a classification confidence meets a threshold value, wherein the classification confidence is based on one or more of: a similarity between a feature of the sensor data sample with a feature of a training data sample, or a difference in likelihood between a plurality of possible classifications.

30. The apparatus of claim 25, wherein the first feature is a mean or standard deviation of an accelerometer resulting in a stationary classification, and wherein the apparatus further comprises means for cancelling computation of subsequent motion related feature computation.

31. The apparatus of claim 25, wherein the first feature is Mel-Frequency Cepstral Coefficient corresponding to audio energy from a microphone resulting in a quiet classification, and wherein the apparatus comprises means for cancelling computation of subsequent audio related feature computation.

32. The apparatus of claim 25, wherein the sensor data sample is from one or more of: an accelerometer, a gyroscope, a magnetometer, a barometric pressure sensor, a temperature sensor, a global positioning sensor, a WiFi sensor, a Bluetooth sensor, an ambient light sensor, a camera, or a microphone.

* * * * *